United States Patent
Nakaya et al.

(10) Patent No.: US 6,516,033 B2
(45) Date of Patent: *Feb. 4, 2003

(54) VIDEO CODING METHOD AND APPARATUS FOR CALCULATING MOTION VECTORS OF THE VERTICES OF A PORTION OF AN IMAGE AND OUTPUTTING INFORMATION OF HORIZONTAL AND VERTICAL COMPONENTS OF THE MOTION VECTORS

(75) Inventors: Yuichiro Nakaya, Tokyo (JP); Junichi Kimura, Hachioji (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/863,428

(22) Filed: May 24, 2001

(65) Prior Publication Data

US 2001/0024473 A1 Sep. 27, 2001

Related U.S. Application Data

(62) Division of application No. 09/626,788, filed on Jul. 26, 2000, now Pat. No. 6,285,713, which is a continuation of application No. 09/364,255, filed on Jul. 30, 1999, now Pat. No. 6,134,271, which is a continuation of application No. 08/903,199, filed on Jul. 15, 1997, now Pat. No. 5,963,259, which is a continuation of application No. 08/516,218, filed on Aug. 17, 1995, now Pat. No. 5,684,538.

(30) Foreign Application Priority Data

Aug. 18, 1994 (JP) .............................................. 6-193970
Aug. 18, 1994 (JP) .............................................. 6-193971

(51) Int. Cl.[7] ................................................. H04N 7/36

(52) U.S. Cl. ................................................. 375/240.17

(58) Field of Search ................ 375/240.17; H04N 7/36

(56) References Cited

U.S. PATENT DOCUMENTS

| 4,937,666 A | 6/1990 | Yang ........................ 348/413.1 |
| 5,016,102 A | 5/1991 | Avis |
| 5,025,482 A | 6/1991 | Murakami et al. |
| 5,295,201 A | 3/1994 | Yokohama |

FOREIGN PATENT DOCUMENTS

| JP | 5-49023 | 2/1993 |
| JP | 5-130581 | 5/1993 |
| JP | 6-500212 | 6/1994 |

OTHER PUBLICATIONS

"A Basic Study on Motion Compensation with Triangles", Technical Report of the Institute of Electronics, Information and Communication Engineers, IE 90–106, pp. 9–16, Mar. 1990.

"A Basic Study on Motion Compensation with Triangles", Nakaya et al, Technical Report of IEICE, IE90–106, 1990, pp. 9–16.

"Motion Compensation for Video Compression Using Control Grid Interpolation", Sullivan et al, Proc. ICASSP 1991, M9.1, pp. 2713–2716.

"General Approach to Block–Matching Motion Estimation", Seferidis et al, Optical Engineering, Jul. 1993, vol. 32, No. 7, pp. 1464–1474.

Primary Examiner—Young Lee
(74) Attorney, Agent, or Firm—Antonelli, Terry, Stout & Kraus, LLP

(57) ABSTRACT

A method and apparatus for coding an image includes calculation of motion vectors of vertices of a patch in an image being encoded and providing an output of horizontal and vertical components of the motion vectors of the vertices and information specifying that values of the horizontal and vertical components of a motion vector for each pixel in the patch are integral multiples of 1/d of a distance between adjacent pixels, where d is an integer not less than 2.

8 Claims, 11 Drawing Sheets

MOTION VECTOR
(uc, vc)

MOTION VECTOR
(uc+1/2, vc)

MOTION VECTOR
(uc+1/2, vc+1/2)

MOTION VECTOR
(uc-1/2, vc-1/2)

o : PIXEL IN THE REFERENCE IMAGE
x : INTERMIDIATE POINT IN THE REFERENCE IMAGE
☐ : PIXEL IN THE BLOCK OF THE ORIGINAL IMAGE

REFERENCE IMAGE

ORIGINAL IMAGE

PATCHES AND GRID POINTS IN THE REFERENCE IMAGE AFTER MOTION ESTIMATION

PATCHES AND GRID POINTS IN THE ORIGINAL IMAGE

PATCHES AND GRID POINTS IN THE REFERENCE IMAGE AFTER COARSE MOTION ESTIMATION

PATCHES AND GRID POINTS IN THE REFERENCE IMAGE IN THE RETIREMENT PROCESS

PATCH IN THE REFERENCE IMAGE AFTER MOTION ESTIMATION

PATCHES IN THE ORIGINAL IMAGE

VIDEO CODING METHOD AND APPARATUS FOR CALCULATING MOTION VECTORS OF THE VERTICES OF A PORTION OF AN IMAGE AND OUTPUTTING INFORMATION OF HORIZONTAL AND VERTICAL COMPONENTS OF THE MOTION VECTORS

CROSS-REFERENCE TO RELATED APPLICATIONS

This is a divisional of U.S. application Ser. No. 09/626,788, filed Jul. 26, 2000, now U.S. Pat. No. 6,285,713 which is a continuation of U.S. application Ser. No. 09/364,255, filed Jul. 30, 1999, now U.S. Pat. No. 6,134,271, which is a continuation of U.S. application Ser. No. 08/903,199, filed Jul. 15, 1997, now U.S. Pat. No. 5,963,259, which is a continuation of U.S. application Ser. No. 08/516,218, filed Aug. 17, 1995, now U.S. Pat. No. 5,684,538, the subject matter of which is incorporated by reference herein.

BACKGROUND OF THE INVENTION

1. Field of the Invention

The present invention relates to a video coding/decoding system and a video coder and a video decoder used with the same system for implementing a motion compensation method in which all the pixels associated with the same patch are not restricted to have a common motion vector and in which the horizontal and vertical components of a motion vector of a pixel can assume an arbitrary value other than an integral multiple of the distance between adjacent pixels.

2. Description of the Related Art

In the high-efficiency coding and decoding of image sequences, a motion compensation method utilizing the analogy between temporally-proximate frames is well known to have a great advantage in compressing the amount of information.

FIGS. 1A and 1B are diagrams showing a general circuit configuration of a video coder 1 and a video decoder 2 to which the motion compensation method described above is applied.

In FIG. 1A, a frame memory 2-1 has stored therein a reference image R providing a decoded image of the previous frame already coded. A motion estimation section 3-1 estimates a motion and outputs motion information using the original image I of the current frame to be coded and the reference image R read out of the frame memory 2-1. A predicted image synthesis circuit 4-1 synthesizes a predicted image P for the original image I using the motion information and the reference image R. A subtractor 5-1 calculates the difference between the original image I and the predicted image P and outputs a prediction error. The prediction error is subjected to the DCT conversion or the like at a prediction error coder 6-1, and transmits the prediction error information together with the motion information to the receiving end. At the same time, the prediction error information is decoded by the inverted DCT conversion or the like at a prediction error decoder 7-1. An adder 8-1 adds the coded prediction error to the predicted image P and outputs a decoded image of the current frame. The decoded image of the current frame is newly stored in the memory 2-1 as a reference image R.

In FIG. 1B, a frame memory 2—2 has stored therein a reference image R providing a decoded image of the previous frame. A synthesis circuit 4-2 synthesizes a predicted image P using the reference image R read out of the frame memory 2—2 and the motion information received. The received prediction error information is decoded by being subjected to the inverse DCT conversion or the like by a prediction error decoder 7-2. An adder 8-2 adds the decoded prediction error to the predicted image P and outputs a decoded image of the current frame. The decoded image of the current frame is newly stored in the frame memory 2—2 as a reference image P.

A motion compensation method constituting the main stream of the current video coding and decoding techniques depends on the "block matching of half-pixel accuracy" employed by MPEG1 and MPEG2 providing the international standard of video coding/decoding method.

In the "block matching of half-pixel accuracy", the original image of the current frame to be coded is segmented into a number n of blocks at the motion estimation section 3-1 in FIG. 1A, and a motion vector is determined for each block as a motion information. The horizontal and vertical components of this motion vector have a minimum unit length equal to one-half of the distance between horizontally and vertically adjacent pixels, respectively. In the description that follows, let the horizontal component of the motion vector of the ith block ($1 \leq i \leq n$) be ui and the vertical component thereof be vi. In a method most widely used for estimating the motion vector (ui,vi), a search range such as $-15 \leq ui \leq 15$, $-15 \leq vi \leq 15$ is predetermined, and a motion vector (ui,vi) which minimizes the prediction error Ei(ui,vi) in the block is searched for. The prediction error Ei(ui,vi) is expressed by Equation 1 using a mean absolute error (MAE) as an evaluation standard.

$$Ei(ui, vi) = \frac{1}{Ni} \sum_{(x,y) \in Bi} |I(x, y) - R(x - ui, y - vi)| \quad (1)$$

In Equation 1, I(x,y) denotes the original image of the current frame to be coded, and R(x,y) a reference image stored in memory. In this equation, it is assumed that pixels exist at points of which the x and y coordinates are an integer on the original image I and the reference image R. Bi designates the pixels contained in the ith block of the original image I, and Ni the number of pixels contained in the ith block of the original image I. The process of evaluating the prediction error for motion vectors varying from one block to another and searching for a motion vector associated with the smallest prediction error is called the matching. Also, the process of calculating Ei(ui,vi) for all vectors (ui,vi) conceivable within a predetermined search range and searching for the minimum value of the vector is called the full search.

In the motion estimation for the "block matching of half-pixel accuracy", ui and vi are determined with one half of the distance between adjacent pixels, i.e., ½ as a minimum unit. As a result, (x−ui,y−vi) is not necessarily an integer, and a luminance value of a point lacking a pixel must actually be determined on the reference image R when calculating the prediction error using Equation 1. The process for determining the luminance value of a point lacking a pixel is called the interpolation, and the point where interpolation is effected is referred to as an interpolated point or an intermediate point. A bilinear interpolation is often used as an interpolation process using four pixels around the interpolated point.

When the process of bilinear interpolation is described in a formula, the luminance value R(x+p,y+q) at the interpolated point (x+p,y+q) of the reference image R can be expressed by Equation 2 with the fractional components of the coordinate value of the interpolated point given as p and q (0≦p<1, 0≦q<1).

$$R(x+p,y+q)=(1-q)\{(1-p)R(x,y)+pR(x+1,y)\}+q\{(1-p)R(x,y+1)+pR(x+1,y+1)\} \quad (2)$$

In the motion estimation by "block matching of half-pixel accuracy", a two-step search is widely used in which, first, the full-search of single-pixel accuracy is effected for a wide search range to estimate a motion vector approximately, followed by the full search of half-pixel accuracy for a very small range defined by, say, plus/minus a half pixel in horizontal and vertical directions around the motion vector. In the second-step search, a method is frequently used in which the luminance value of an interpolated point on the reference image R is determined in advance. An example of the process according to this method is shown in FIGS. 2A, B, C and D. In this example, a block containing four pixels each in longitudinal and lateral directions is used. In FIGS. 2A, B, C and D, the points assuming an integral coordinate value and originally having a pixel in a reference image are expressed by a white circle ○, and the interpolated points for which a luminance value is newly determined are represented by X. Also, the pixels in a block of the original image of the current frame are expressed by a white square □. The motion vector obtained by the first-step search is assumed to be (uc,vc). FIG. 2A shows the state of matching when the motion vector is (uc,uv) in the first-step search. The prediction error is evaluated between each pair of ○ and □ overlapped. FIGS. 2B, C and D show the case in which the motion vector is (uc+½,vc), (uc+½,vc+½), (uc-½,vc-½) in the second-step search. The prediction error is evaluated between each overlapped pair of X and □ in FIGS. 2B, C and D. As seen from these drawings, in the case where the range for the second-step search is ±½ pixel each in longitudinal and lateral directions, the matching process for eight motion vectors ((uc,vc±½), (uc±½,vc), (uc+½,vc±½), (uc-½, vc±½) can be accomplished by determining the luminance value of 65 (=the number of X in each drawing) interpolated points in advance. In the process, all the interpolated points of which the luminance value was determined are used for matching.

On the other hand, assuming that the interpolation calculation is made on a reference image each time of matching, a total of 128 (=16×8, in which 16 is the number of white squares in FIGS. 2B, C and D, and 8 is the number of times the matching is made) interpolations would be required.

As described above, the number of interpolation operations can be reduced by determining the luminance value of the interpolated points on the reference image R in advance by reason of the fact that the same interpolated point on the reference image R is used a plurality of times.

Also, in the "block matching of half-pixel accuracy", a predicted image is synthesized using the relation of Equation 3 in the synthesis circuits 4-1, 4-2 shown in FIGS. 1A and 1B.

$$P(x,y)=R(x-ui,y-vi),(x,y)\in Bi(1\leq i\leq n) \quad (3)$$

In Equation 3, P(x,y) shows an original image I(x,y) of the current frame to be coded which is predicted by use of the reference image R(x,y) and the motion vector (ui,vi). Also, assuming that the predicted image P is segmented into a number n of blocks corresponding to the original image I, Bi represents a pixel contained in the ith block of the predicted image P.

In the "block matching of half-pixel accuracy", as described above, the value of (x-ui,y-vi) is not necessarily an integer, and therefore the interpolation process such as the bilinear interpolation using Equation 2 is carried out in synthesizing a predicted image.

The "block matching of half-pixel accuracy" is currently widely used as a motion compensation method. Applications requiring an information compression ratio higher than MPEG1 and MPEG2, however, demand an even more sophisticated motion compensation method. The disadvantage of the "block matching" method is that all the pixels in the same block are required to have the same motion vector.

In order to solve this problem, a motion compensation method allowing adjacent pixels to have different motion vectors has recently been proposed. The "motion compensation based on spatial transformation" which is an example of such a method is briefly explained below.

In the "motion compensation based on spatial transformation", the relation between the predicted image P and the reference image R in synthesizing a predicted image at the synthesis circuit 4-1, 4-2 in FIGS. 1A and 1B is expressed by Equation 4 below.

$$P(x,y)=R(fi(x,y),gi(x,y)),(x,y)\in Pi(1\leq i\leq n) \quad (4)$$

In Equation 4, on the assumption that the predicted image P is segmented into a number n of patches corresponding to the original image I, Pi represents a pixel contained in the ith patch of the predicted image P. Also, the transformation functions fi(x,y) and gi(x,y) represent a spatial correspondence between the predicted image P and the reference image R. The motion vector for a pixel (x,y) in Pi can be represented by (x-fi(x,y),y-gi(x,y)). The predicted image P is synthesized by calculating the transformation functions fi(x,y), gi(x,y) with respect to each pixel in each patch and determining the luminance value of corresponding points in the reference image R in accordance with Equation 4. In the process, (fi(x,y), gi(x,y)) is not necessarily an integer, and therefore the interpolation process such as the bilinear interpolation is performed using Equation 3 as in the case of the "block matching of half-pixel accuracy".

The "block matching" can be interpreted as a special case of the "motion compensation based on spatial transformation" in which the transformation function is a constant. Nevertheless, the words "motion compensation based on spatial transformation" as used in the present specification are not assumed to include the "block matching".

Examples of the transformation functions fi(x,y), gi(x,y) in the "motion compensation based on spatial transformation" include the case using the affine transformation shown in Equation 5 (refer to "Basic Study of Motion Compensation Based on Triangular Patches" by Nakaya, et al., Technical Report of IEICE, IE90–106, H2-03) shown below $$fi(x,y)=ai1x+ai2y+ai3gi(x,y)=ai4x+ai5y+ai6 \quad (5),$$

the case using the bilinear transformation given in Equation 6 (G. J. Sullivan and R. L. Baker, "Motion compensation for video compression using control grid interpolation", Proc. ICASSP '91, M9.1, pp.2713–2716, 1991–05) shown below $$fi(x,y)=bi1xy+bi2x+bi3y+bi4gi(x,y)=bi5xy+bi6x+bi7y+bi8 \quad (6),$$

and the case using the perspective transformation given in Equation 7 (V. Seferdis and M. Ghanbari, "General approach to block-matching motion estimation", Optical Engineering, vol. 32, no. 7, pp. 1464–1474, 1993–07) shown below $$fi(x, y) = \frac{ci4x + ci5y + ci6}{ci1x + ci2y + ci3} \quad (7)$$

$$gi(x, y) = \frac{ci7x + ci8y + ci9}{ci1x + ci2y + ci3}$$

In Equations 5, 6 and 7, aij, bij, cij (j: 1 to 9) designate motion parameters estimated for each patch as motion information at the motion estimation section 3-1 in FIG. 1A. An image identical to the predicted image P produced at the synthesis circuit 4-1 of the video coder 1 can be obtained at the synthesis circuit 4-2 of the video decoder 2 at the receiving end in such a manner that information capable of specifying the motion parameter of the transformation function for each patch in some form or other is transmitted by the video coder 1 as motion information to the video decoder 2 at the receiving end. Assume, for example, that the affine transformation (Equation 5) is used as the transformation function and the patch is triangular in shape. In such a case, six motion parameters can be transmitted directly as motion information. Alternatively, the motion vectors of three vertices of a patch may be transmitted so that six motion parameters indicated by Equation 5 are calculated from the motion vectors of the three vertices at the receiving end. Also, in the case where the bilinear transformation (Equation 6) is used as the transformation function, the employment of a quadrilateral patch makes it possible to transmit the desired one of eight motion parameters and the motion vectors of four vertices of the patch.

The following explanation refers to the case using the affine transformation (Equation 5) as the transformation function. This explanation applies substantially directly with equal effect to the case where other transformations (Equation 6, 7, etc.) are employed.

Even after a transformation function is established, many variations are conceivable for the "motion compensation based on spatial transformation". An example is shown in FIG. 3. In this case, the motion vector is restricted to continuously change at the patch boundary. First, an original image I202 of the current frame is segmented into a plurality of polygonal patches, thereby constituting a patch-segmented original image I208. The vertices of these patches are called the grid points, each of which is shared by a plurality of patches. A patch 209 in FIG. 3, for example, is composed of grid points 210, 211, 212, which function also as vertices of other patches. After the original image I202 is segmented into a plurality of patches in this way, motion estimation is performed. In the shown example, motion estimation is performed with a reference image R201 with respect to each grid point. As a result, each patch is deformed on the reference image R203 after motion estimation. The patch 209, for instance, corresponds to the deformed patch 204. This is by reason of the fact that the grid points 205, 206, 207 on the original image I208 are estimated to have been translated to the grid points 210, 211, 212 respectively on the reference image R203 as a result of motion estimation. Since most of the grid points are shared by multiple patches in this example, the amount of transmitted data can be reduced by transmitting the motion vectors of the grid points rather than transmitting the affine transformation parameters of each patch.

In the "motion compensation based on spatial transformation", as in the "block matching", it is pointed out that the motion estimation based on matching is effective. An example algorithm for motion estimation based on matching is described below. This scheme is called the "hexagonal matching" and is effectively applied to the case where the motion vector continuously changes at the patch boundary. This scheme is configured of two processes:

(1) Coarse motion estimation of grid points by "block matching"; and
(2) Correction of motion vector by "refinement algorithm".

In process (1), the block matching is applied to a block of a given size containing a grid point, and the motion vector of this block is determined as a coarse motion vector for the grid points existing in the particular block. The object of process (1) is nothing but to determine a coarse motion vector of a grid point and is not always achieved using the block matching. The manner in which process (2) is carried out is shown in FIG. 4. FIG. 4 shows a part of a patch and grid points in the reference image R which corresponds to the reference image R203 in FIG. 3. Thus, changing the position of a grid point in FIG. 4 is indicative of changing the motion vector of the same grid point. In refining the motion vector of the grid point 301, the first thing to do is to fix the motion vectors of the grid points 303 to 308 representing the vertices of a polygon 302 configured of all the patches involving the grid point 301. The motion vector of the grid point 301 is changed with a predetermined search range in this way. For example, the grid point 301 is translated to the position of the grid point 309. As a result, the prediction error within each patch contained by the polygon 302 also undergoes a change. The motion vector minimizing the prediction error within the polygon 302 in the search range is registered as a refined motion vector of the grid point 301. The refinement of the motion vector of the grid point 301 is thus completed, and a similar operation of refinement is continued by translating to another grid point. Once all the grid points are refined, the prediction error can be further reduced by repeating the refinement from the first grid point. The appropriate number of repetitions of the refinement process is reported to be two or three.

A typical search range for the refinement algorithm is ±3 pixels in each of horizontal and vertical directions. In such a case, a total of 49 (=7×7) matching operations are performed for each grid point in the polygon 302. Since each patch is involved in the refinement algorithm for three grid points, on the other hand, it follows that a total of 147 (=49×3) evaluations of prediction error is performed for each pixel in a patch. Further, each repetition of this refinement process increases the number of prediction error evaluations correspondingly. Consequently, each time of prediction error evaluation, interpolation computations are carried out for the interpolated points involved on the reference image, thereby enormously increasing the amount of computations.

The problem of interpolation computation in the motion estimation for the "motion compensation based on spatial transformation" is complicated due to the essential difference thereof from the similar problem in the motion estimation for the "block matching at half-pixel accuracy". In the "motion compensation based on spatial transformation", even when the horizontal and vertical components of the motion vector of each grid point are restricted to an integral multiple of ½, the horizontal and vertical components of the motion vector of each pixel in each patch are not necessarily an integral multiple of ½. Also, in view of the fact that the components below the decimal point of the motion vector for each pixel in each patch generally can assume an arbitrary value, the luminance value of the same interpolated point on the reference image R is rarely used a plurality of times in the matching operation.

The feature of the "motion compensation based on spatial transformation" is that a numerical operation is required for determining a motion vector for each pixel. In the case where the computation accuracy varies between the transmitting and receiving ends in computing a motion vector (transformation function), a mismatch may occur in which the predicted image P obtained at the synthesis circuit 4-1 of the video coder 1 is different from the predicted image P produced from the synthesis circuit 4-2 of the video decoder 2. This mismatch of the predicted image P has the property of accumulating at the receiving end. Even when there is only a small error for each frame, therefore, the quality of the decoded image output from the video decoding circuit 2 may be seriously affected in the end. This problem is not posed by the "block matching" in which all the pixels in a block follow the same motion vector and this particular motion vector is coded and transmitted directly as motion information.

An example of employing the affine transformation (Equation 5) as a transformation function to cope with this problem is explained. A method of solving such a problem is by enhancing the computation accuracy of Equation 5 sufficiently to reduce the computation error of Equation 5 sufficiently below the quantization step size of the luminance value. A case using this solution is studied below.

Assume, for example, that the luminance value is quantized in 8 bits with the quantization step size of 1 and that the maximum value of the luminance value is 255 (11111111) and the minimum value thereof is 0 (00000000). Also, assume that the luminance values of four adjacent pixels on the reference image P are $R(0,0)=0$, $R(0,1)=0$, $R(1,0)=255$, and $R(1,1)=255$, respectively. Further, it is assumed that the computation of Equation 5 is carried out to determine $fi(x,y)$ when the horizontal and vertical coordinates of a point on the reference image R corresponding to a pixel $P(x,y)$ on the predicted image P are given by $0<gi(x,y)<1$ and $0<fi(x,y)<1$, respectively. This condition is hereinafter referred to as the worst condition.

Under this worst condition, a computation error more than $1/255$ in magnitude of $fi(x,y)$ always leads to an error of the quantized value of the luminance. For a mismatch to be prevented, therefore, both the video coder 1 and the video decoder 2 must be fabricated in such a manner as to secure the computation error of Equation 5 sufficiently smaller than $1/255$. Improving the computation accuracy, however, generally leads to an increased number of digits for internal expression of a numerical value, thereby further complicating the computation process. In the motion compensation process, Equation 5 is computed so frequently that an increased complication of this computation process has a serious adverse effect on the total amount of information processed.

SUMMARY OF THE INVENTION

With the "motion compensation based on spatial transformation", motion estimation based on matching poses the problem of a greatly increased amount of computations required for interpolation of luminance values at points lacking a pixel on the reference image R. A more complicated computation operation is another problem which will be posed if the computation accuracy for synthesizing each predicted image P in the video coder and the video decoder is to be improved to accommodate a mismatch between a predicted image P obtained at the sending end and a predicted image P obtained at the receiving end.

An object of the present invention is to realize a motion estimation process with a small amount of computations by reducing the number of calculations for interpolation of luminance values.

Another object of the invention is to provide a method of reducing the computation accuracy required for computing the transformation function at the time of synthesizing a predicted image P and also preventing the mismatch between the predicted images P attributable to the computation accuracy of the transformation function.

Prior to motion estimation, a high-resolution reference image R' is prepared for which the luminance value of a point having x and y coordinates equal to an integral multiple of 1/m1 and 1/m2 (m1 and m2 are positive integers) respectively is determined by interpolation on the reference image R. It follows therefore that in the high-resolution reference image R', pixels exist at points whose x and y coordinate values are an integral multiple of 1/m1 and 1/m2 respectively. In the case where the luminance value of the reference image R at a position having a coordinate value other than an integer becomes required in the process of motion estimation, such a value is approximated by the luminance value of a pixel existing at a position nearest to the particular coordinate in the high-resolution reference image R'. The object of reducing the number of interpolation computations thus is achieved.

In the above-mentioned process for preparing the high-resolution reference image R', interpolation computations in the number of m1×m2−1 per pixel of the original image I are required. Once the interpolation process for achieving a high resolution is completed, however, the motion estimation process does not require any further computations for interpolation. In the case of the "motion compensation based on spatial transformation" described with reference to the related art above, more than 147 interpolation computations is required for each pixel in the motion estimation. When it is assumed that m1=m2=2, the number of required interpolation computations is not more than three per pixel or about one fiftieth of the conventional requirement. Even when m1=m2=4, the number of required interpolation computations is only 15, which is as small as about one tenth. The computation amount thus can be reduced remarkably.

Also, assume that the horizontal and vertical components of the motion vector of each pixel used for synthesizing the predicted image P in the video coder and the video decoder are defined to take a value equivalent only to an integral multiple of 1/d1 or 1/d2 (d1 and d2 being integers) respectively of the distance between adjacent pixels. The object of reducing the required computation accuracy of the transformation function and preventing a mismatch is thus achieved.

In the case where the above-mentioned rule on motion vectors is employed, the magnitude of the computation error of the transformation function $fi(x,y)$ always leading to an error of the quantization value of luminance under the "worst condition" described with reference to the related art above is 1/d1. Suppose d1=4, for example, the risk of causing a mismatch of the predicted images under the "worst condition" is maintained substantially at the same level even when the computation accuracy of $fi(x,y)$ is reduced by 6 bits as compared with the proposed solution described above with reference to the related art.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1A:
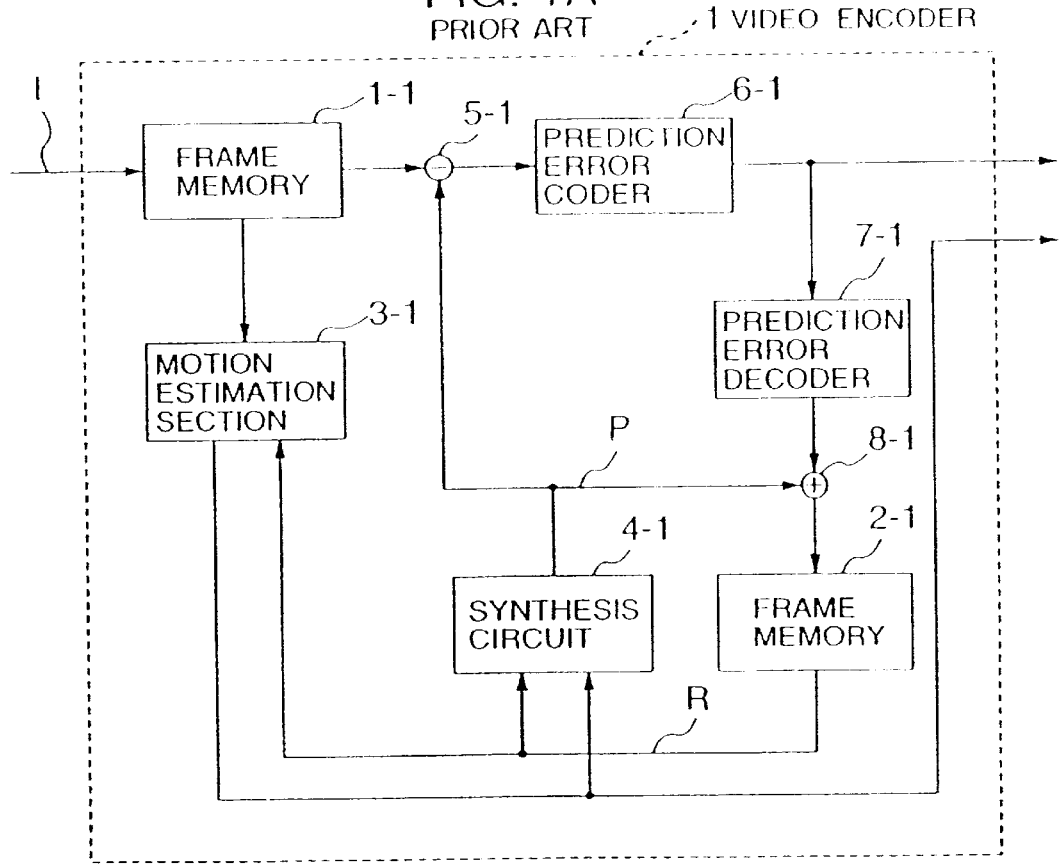
FIG. 1A is a diagram showing an example of a conventional video coder.
Figure 1B:
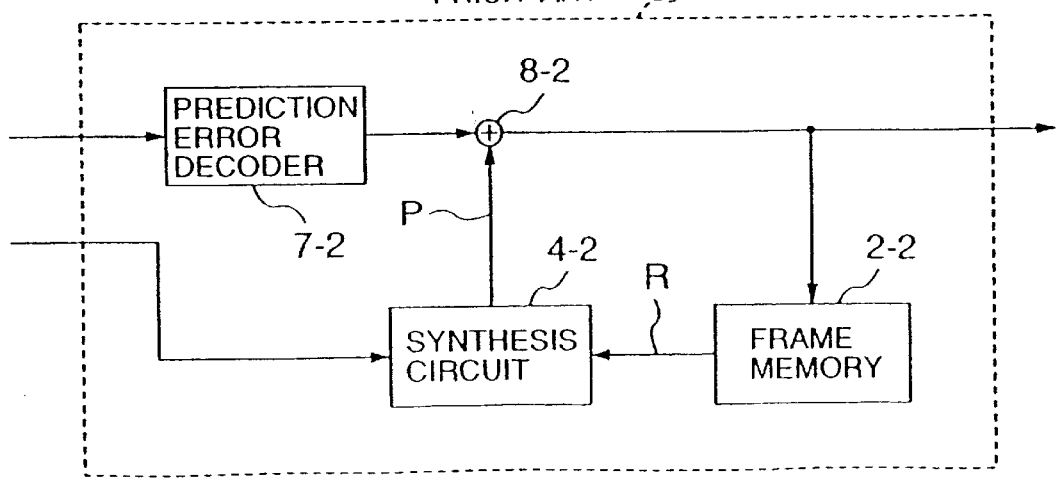
FIG. 1B is a diagram showing an example of a conventional video decoder.
Figure 2A:
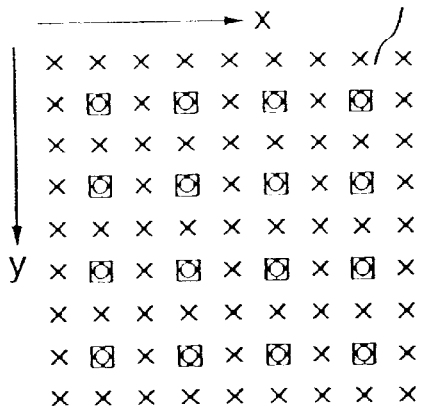
FIGS. 2A to 2D are diagrams showing an example process of the second-step search in the "block matching of half-pixel accuracy".
Figure 2B:
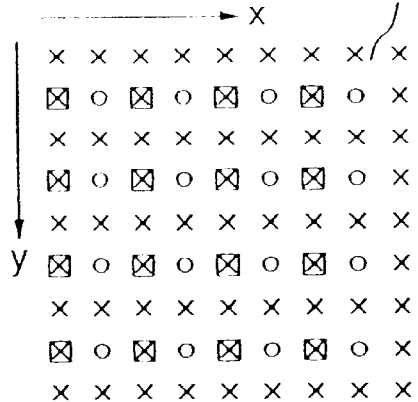
Figure 2C:
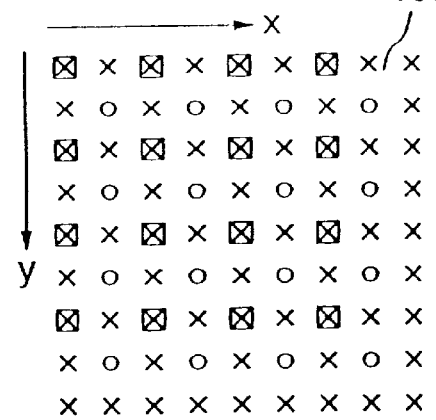
Figure 2D:
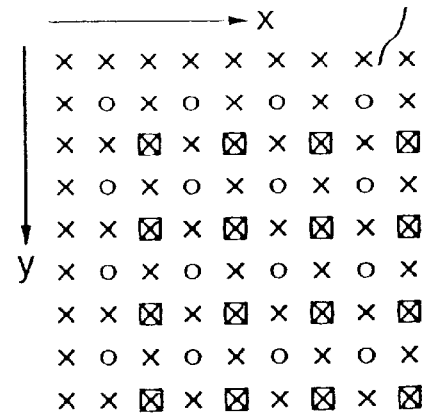
Figure 3:
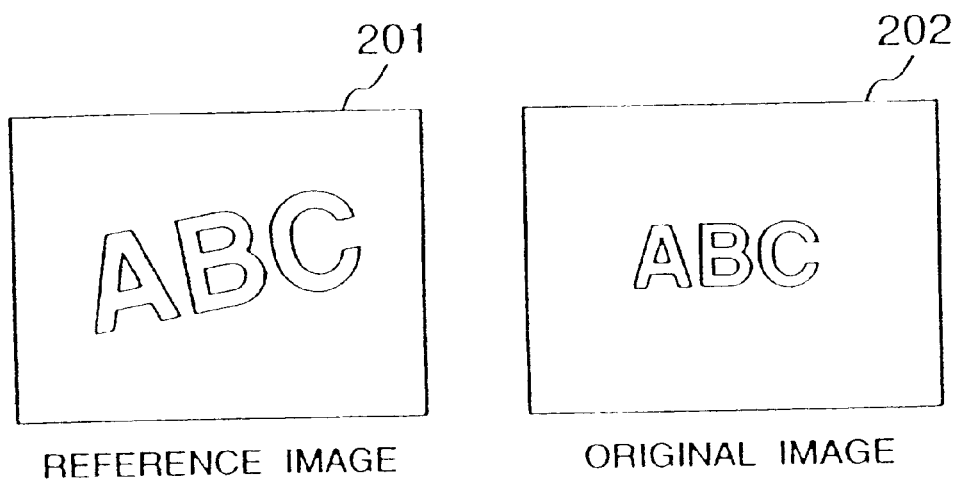
FIG. 3 is a diagram showing an example process for motion estimation in the "motion compensation based on spatial transformation".
Figure 3:
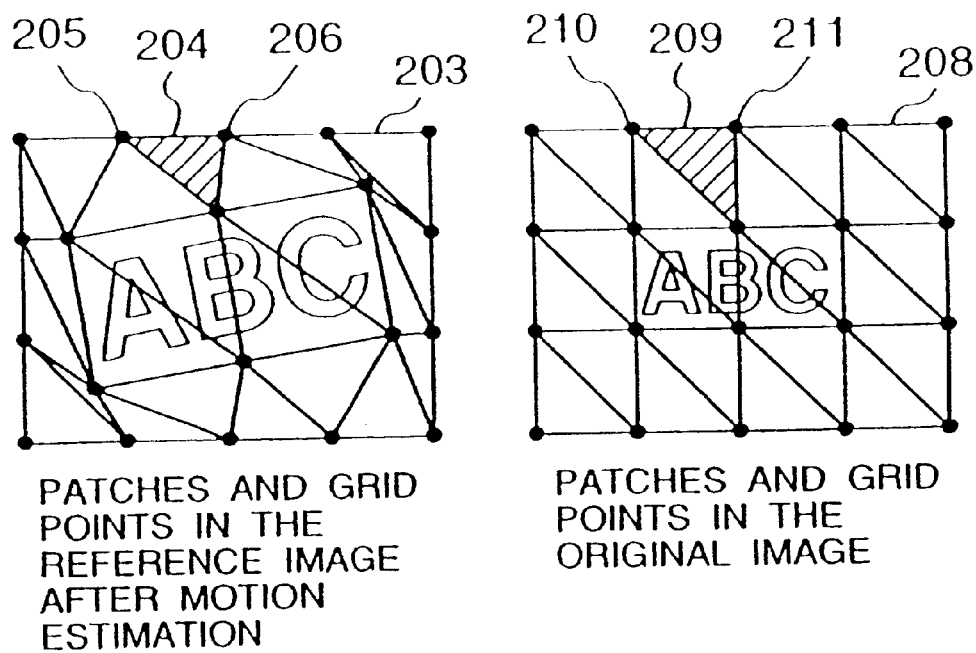
Figure 4:
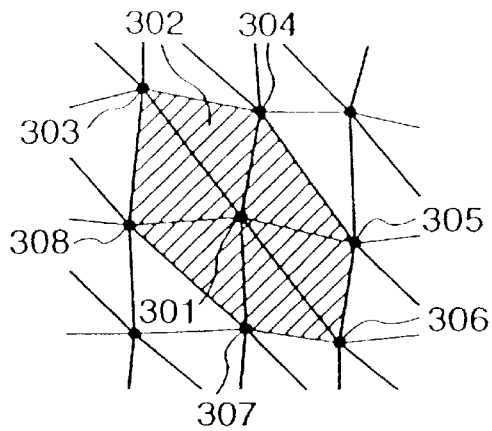
FIG. 4 is a diagram showing the process according to a scheme called the "hexagonal matching" as an example of motion estimation operation in the "motion compensation based on spatial transformation".
Figure 4:
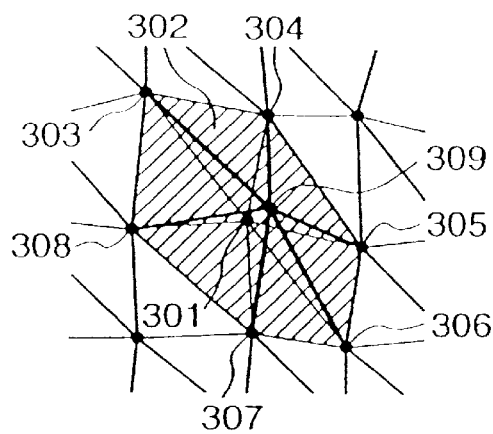

A method of performing the motion estimation operation by improving the resolution of the whole reference image R in a video coder 1 will be explained as a first embodiment. First, the luminance value of a point lacking a pixel on the reference image R is interpolated to form a high-resolution reference numeral R'. Assuming that the bilinear interpolation (Equation 3) is used as an interpolation scheme for the luminance value, the high-resolution reference numeral R' is given by Equation 8.

$$R'\left(x + \frac{s}{m1}, y + \frac{t}{m2}\right) = \left(1 - \frac{t}{m2}\right)\left\{\left(1 - \frac{s}{m1}\right)R(x, y) + \frac{s}{m1}R(x+1, y)\right\} + \frac{t}{m2}\left\{\left(1 - \frac{s}{m1}\right)R(x, y+1) + \frac{s}{m1}R(x+1, y+1)\right\} \quad (8)$$

where it is assumed that s and t are an integral number and that $0 \leq s < m1$ and $0 \leq t < m2$. On the high-resolution reference image R', pixels are assumed to exist at points where all of x, y, s and t are an integral number. The points where s=t=0 corresponds originally to pixels existing on the reference image R, and the luminance value of other points can be determined by interpolation.

In the description that follows, an embodiment will be explained with reference to the case in which m1=m2=m (m: positive integral number) for the sake of simplicity.

Figure 5:
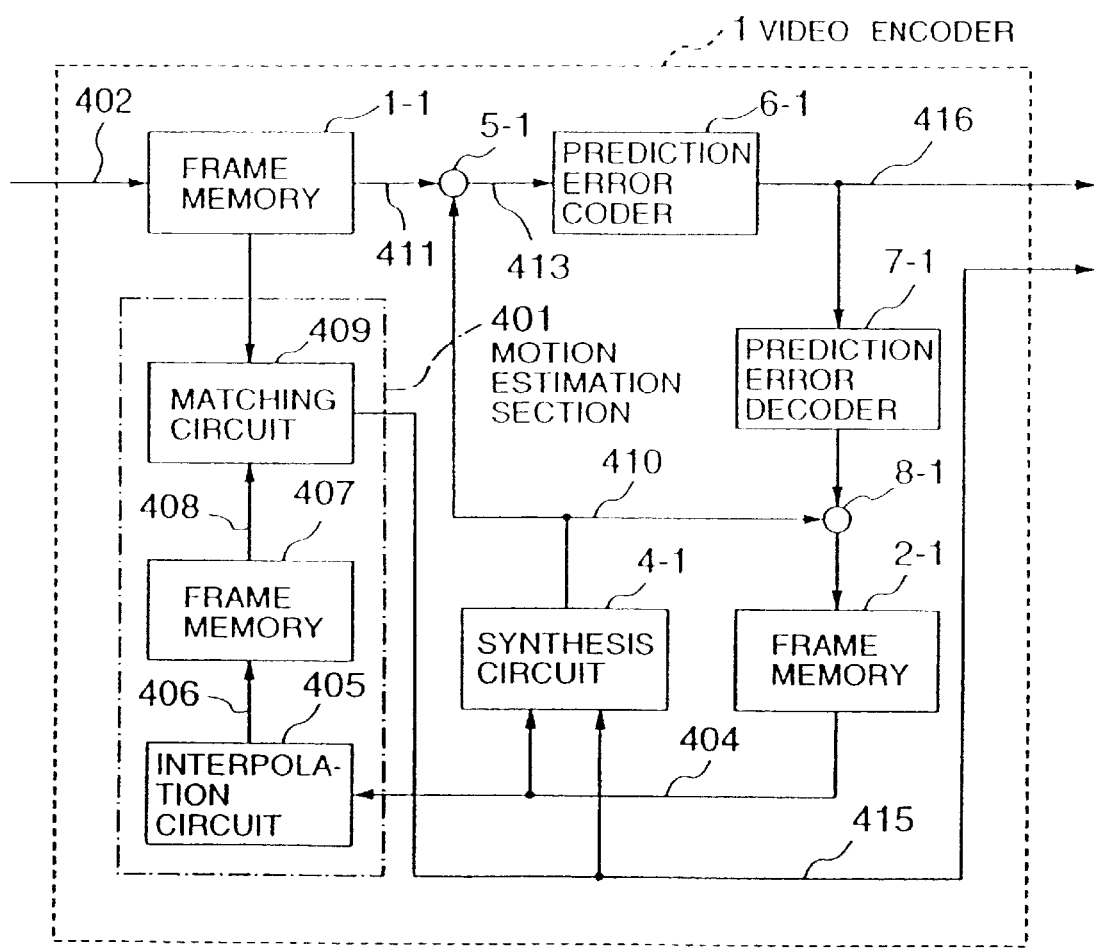
FIG. 5 is a diagram showing an example of a video coder utilizing a high-resolution reference image.

An example of an video coder 1 utilizing the high-resolution reference image R' is shown in FIG. 5. The arrows in FIG. 5 indicate a data flow while address signals are not shown. In this system, a motion estimation section 401 is in charge of motion estimation. A reference image 404, after being processed at a reference image interpolation circuit 405 for improving the resolution, is stored in a frame memory 407 as a high-resolution reference image R' 406 thereby to provide an approximated luminance value 408 to a matching circuit 409. On the other hand, the original image 1402 of the current frame is stored in the frame memory 403 and utilized for motion estimation at the matching circuit 409. The motion information 415, which is output from the matching circuit 409 is transmitted to the receiving end, is also utilized for synthesizing a predicted image P410 at a synthesis circuit 4-1 in the video coder 1. The difference between the synthesized predicted image P410 and the original image 1411 of the current frame is determined at a subtrator 5-1 and coded at a prediction error coder 6-1 as a prediction error 413 while being transmitted as a prediction error information 416. In the conventional method, the computation of the transformation function, the interpolation and the evaluation of the prediction error are all performed at a matching circuit. According to this embodiment, by contrast, the amount of computations is reduced by performing the interpolation operation in advance at the interpolation circuit 405. Also, by using the high-resolution reference image R', the computation accuracy required for the computation of a transformation function at the matching circuit 409 can be reduced. Further, the related process can be simplified. This is due to the fact that in the case of an error occurred in the computation of a transformation function, the result of motion estimation is not affected as far as the pixels used as an approximated value on the high-resolution reference image R' are not different. All the pixels on the high-resolution reference image R' of which the luminance value is determined by interpolation are not necessarily used for the matching operation. This point is different from the example of the "block matching of half-pixel accuracy" described above.

Figure 6:
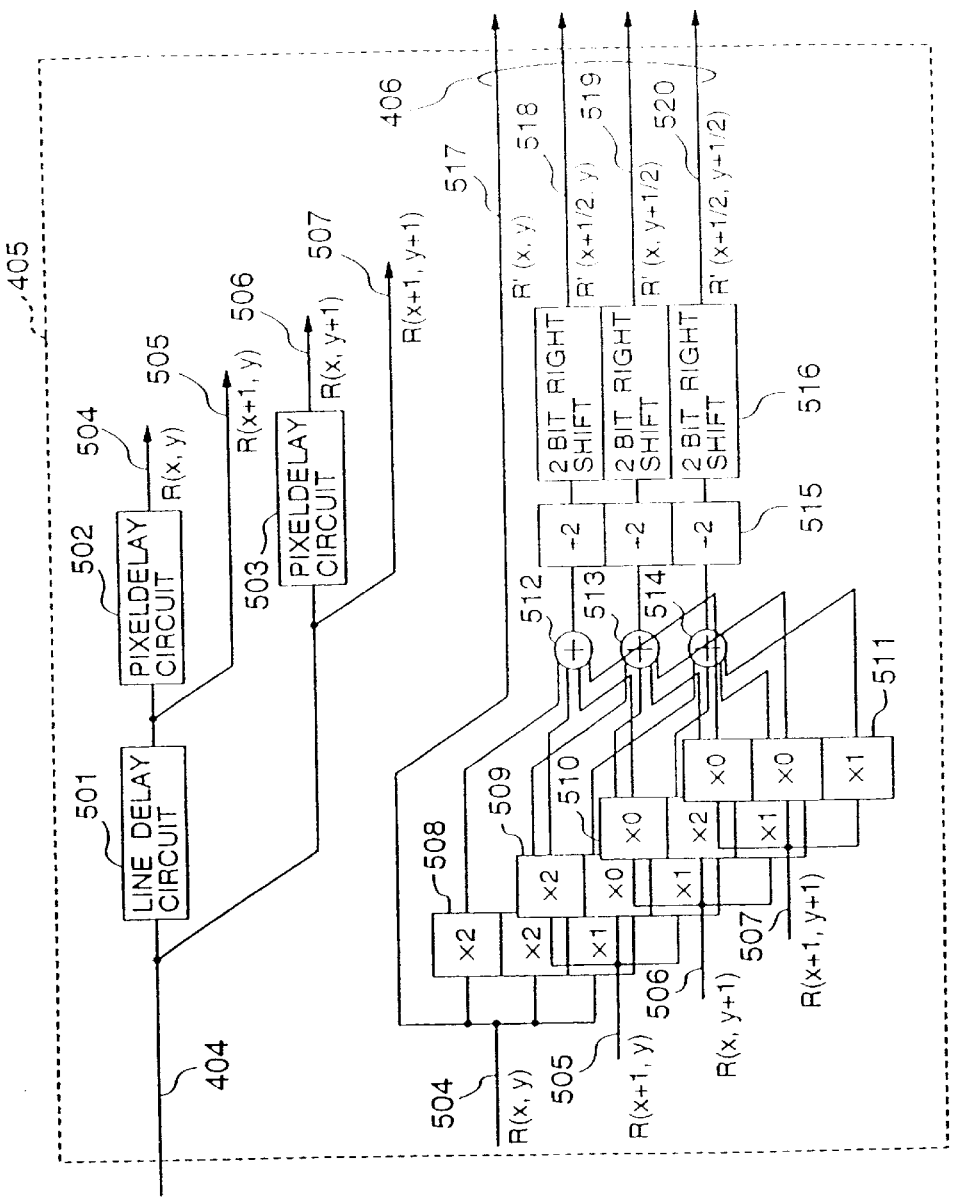
FIG. 6 is a diagram showing an example of an interpolation circuit using the bilinear interpolation for interpolation of luminance values.

An example of the interpolation circuit 405 using the bilinear interpolation (Equation 8) for the interpolation of a luminance value is shown in FIG. 6 assuming that m=2. Also in this diagram, the arrows indicate the data flow, and the reference numerals identical to those in FIG. 5 denote the same component elements respectively. The input reference image signal 404 is assumed to apply a luminance value of pixels from left to right for each line downward. This signal is applied to a circuit including two pixel delay circuits 501, 502 and a line delay circuit 501, thereby producing luminance values 504 to 507 of four pixels adjacent in the four directions. These luminance values 504 to 507 are multiplied by a weighting coefficient corresponding to the interpolation position using multipliers 508 to 511 respectively, and the result is applied to adders 512 to 514. The result of addition is further applied to an adder 515 and a shift register 516 to achive the division by 4 (four) and rounding of the quotient. As a result of the aforementioned process, the luminance values 517 to 520 for the four pixels of the high-resolution reference image R' can be obtained as an output 406.

Figure 7:
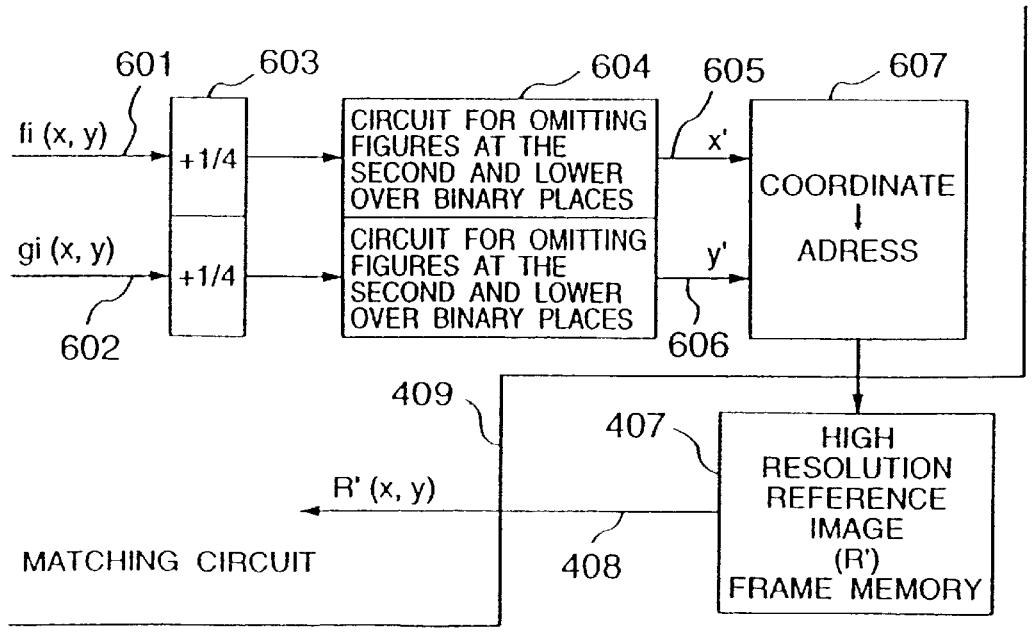
FIG. 7 is a diagram showing an example circuit for producing a luminance value in a high-resolution reference image from the result of computations of the transformation function in a matching circuit.

FIG. 7 shows an example circuit for producing an approximated value R'(x',y') of the luminance value at an interpolated point of the reference image using the high-resolution reference image R' in the matching circuit 409. The reference numerals identical to those in FIG. 5 denote the same component elements respectively. In the case under consideration, the fixed point binary representation of the coordinates fi(x,y) 601 and gi(x,y) 602 on the reference image R are assumed to be given by calculating the transformation function (Equations 5 to 7). Also, it is assumed that m is 2 as in the case of FIG. 6 and that the high-resolution reference image R' is stored in the frame memory 407. The coordinate values fi(x,y) 601 and gi(x,y) 602 are applied through an adder 603 for adding ¼ and a circuit 604 that omits the figures at the second and lower order binary places and thus are converted into an integer multiple of ½. The resulting coordinate values x'605 and y'606 correspond to the coordinate values at a point having a pixel on the high-resolution reference image R'. These coordinate values x'605 and y'606 are converted into an address of the frame memory 407 by a coordinate-address conversion circuit 607, thereby producing an intended approximated luminance value 408 from the frame memory 407. In the case under consideration, the components of the third and lower places below decimal point of the computation result of the transformation function are not used at all. It follows therefore that any computation error in a range not affecting the second and higher places below decimal point of the computation result of the transformation function does not affect the result of motion estimation. This is due to the fact that, as described above, the use of the high-resolution reference image R' has reduced the computation accuracy required of the transformation function computation.

In the first embodiment, although the number of interpolation computations is reduced, a memory capable of storing an image four times larger than the reference image R is required as the frame memory 407 for storing the high-resolution reference image R'. In view of this, a second embodiment is described below, in which although the number of interpolation computations required is increased as compared with the first embodiment, the required memory capacity is reduced.

In the second method, while the required portion of the original image I and the reference image R of the current frame are fetched little by little, the reference image R is interpolated and used for motion estimation. The distance between adjacent pixels is assumed to be unity for both horizontal and vertical directions on the original image I of the current frame and the reference image R. The description below is based on the assumption that the "hexagonal matching" is used for motion estimation, and is centered on a circuit for executing the refinement operation in the "hexagonal matching". The coarse motion estimation of grid points which constitutes another process for the "hexagonal matching", as already explained, is carried out by executing the "block matching" for a block containing the grid points.

Figure 8:
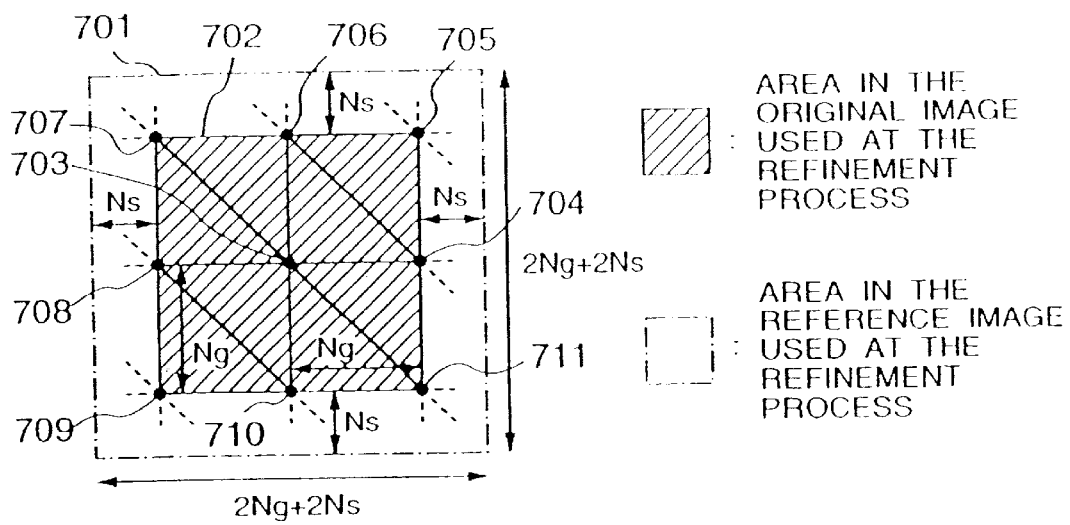
FIG. 8 is a diagram showing the range of pixels used for refinement in the "hexagonal matching".
Figure 9:
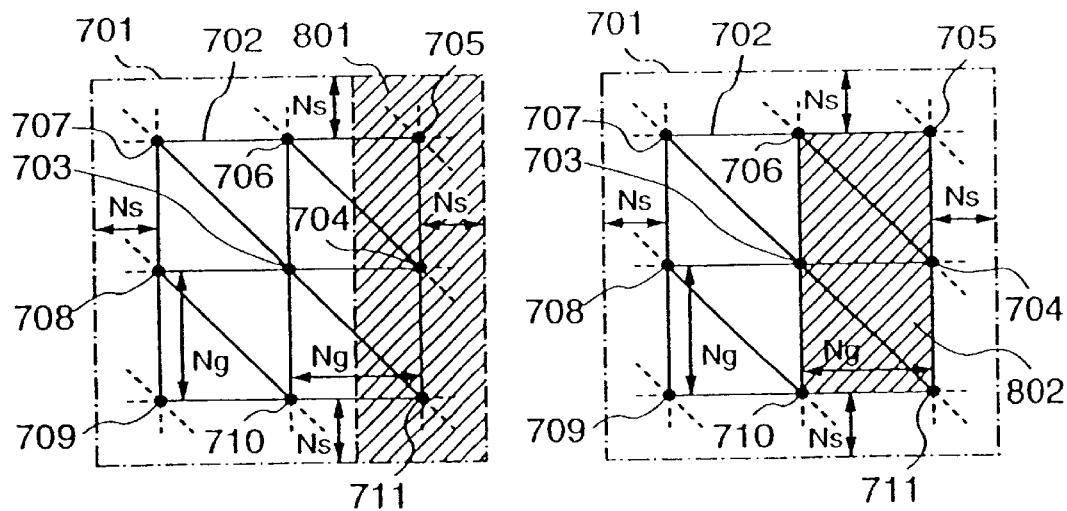
FIG. 9 is a diagram showing the range of pixels additionally required for performing the refinement following the adjacent grid points in the refinement process for the "hexagonal matching".

FIG. 8 shows the position of grid points 703 to 711 in a portion of the original image I of the current frame. Assume that the interval between grid points is Ng in horizontal and vertical directions and the search range of the motion vector for each grid point is ±Ns in horizontal and vertical directions. The "hexagonal matching" for the grid point 703 can be refined by using the pixels contained in the range 701 of 2Ng+2Ns in horizontal and vertical directions of the reference image R and the range 702 (shadowed portion) of 2Ng in horizontal and vertical directions of the original image of the current frame. Actually, however, a smaller range will do, even though a square area is used to simplify the process. A device for performing the refinement process can thus perform subsequent processes independently of the external frame memory by reading the luminance values of the pixels contained in this range in advance. Also, in this case, if the grid point 708 is refined before the grid point 703, it follows that a part of the pixels of the range 701 and range 702 has already been read in the refinement device. In such a case, as shown in FIG. 9, only the range 801 of the reference image R and the range 802 of the original image I of the current frame are additionally read. In FIG. 9, the reference numerals identical to those in FIG. 8 designate the same component parts respectively. In the process of additional reading, a portion of the data on the pixels on the original image I and the reference image R used for motion estimation of the grid point 708 becomes unnecessary. The data of the ranges 801 and 802, therefore, can be written on a memory which thus far contained the same data portion. In this way, the process can be simplified by reading only the data which becomes newly required each time of movement from left to right of a grid point for motion estimation.

Figure 10:
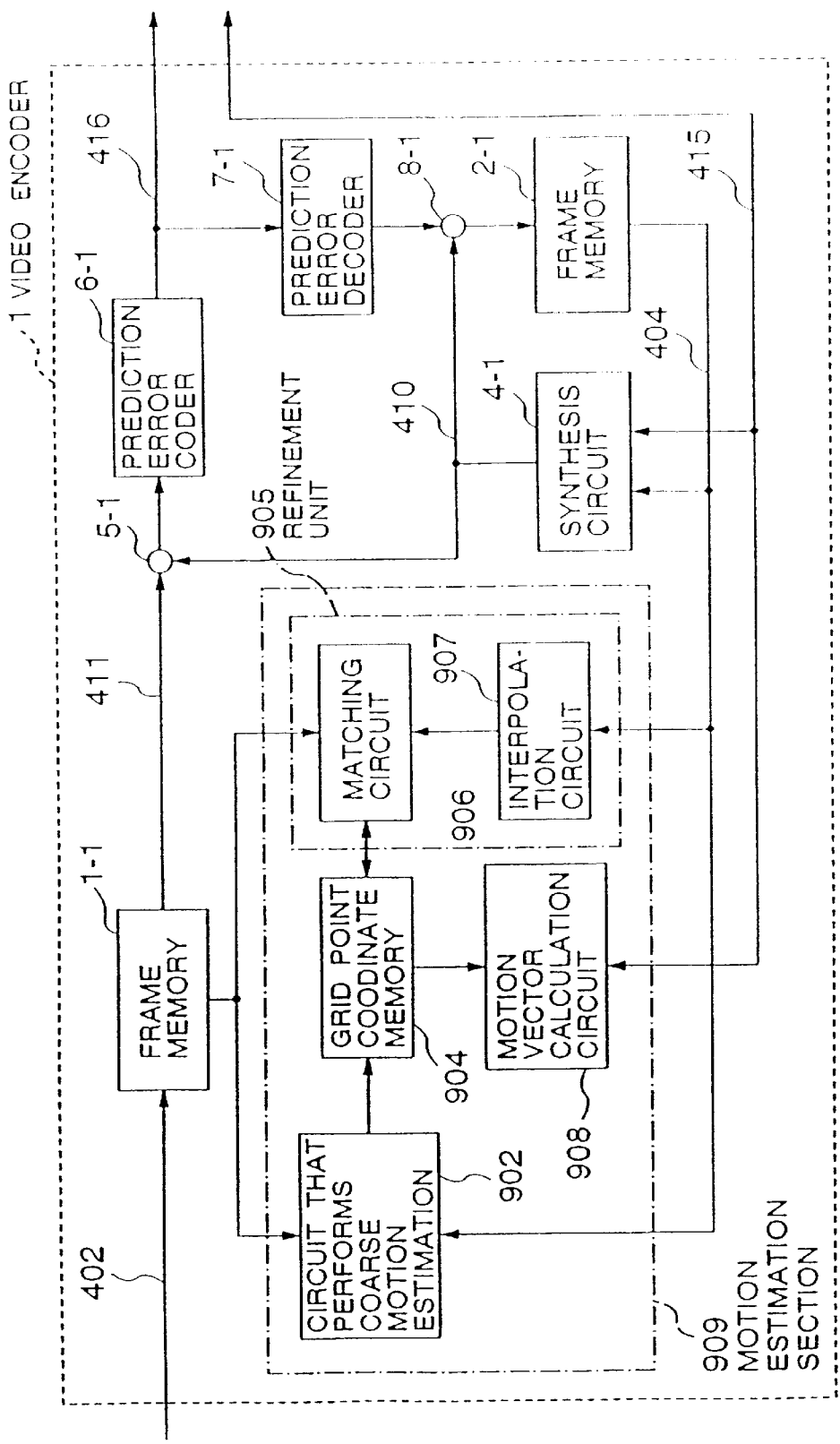
FIG. 10 is a diagram showing a video coder including a motion estimation section for performing motion estimation by improving the resolution of a reference image while fetching the required portions of the original image of the current frame and a reference image little by little.

FIG. 10 is a diagram showing an example of the video coder 1 including a motion estimation section 909 for refining the "hexagonal matching" according to the method shown in FIGS. 8 and 9. In FIG. 10, the arrows indicate the flow of data, and the same reference numerals as those of FIG. 5 designate the same component elements respectively. The motion estimation section 909 is configured differently from but has the same function as the motion estimation section 401 in FIG. 5. The original image I402 of the current frame and the reference image R404 of the input are stored in frame memories 1—1 and 2-1 respectively. First, an coarse motion estimation of a grid point is executed at a circuit 902, and according to the motion vector thus determined, the coordinate information of the grid point on the reference image is stored in a grid point coordinate memory 904. Then, a refinement process section 905 refines the "hexagonal matching". The description below deals with the refinement process to be performed for the grid point 703 as in the example of FIG. 9 immediately after the grid point 708 was refined. The refinement process section 905 includes an interpolation circuit 907 and a matching circuit 906. First, the interpolation circuit 907 reads out the luminance value of pixels in a range (the range 801 in the case of FIG. 9) newly required from the frame memory 2-1 in which a reference image is stored. This information is interpolated and a high-resolution reference image R' in a range required for motion estimation is thus produced. This high-resolution reference image R' is applied to the matching circuit 906. The matching circuit 906 similarly reads the luminance value in a range (the range 802 in the case of FIG. 9) newly required from the frame memory 1—1 of the original image I of the current frame. The matching circuit 906 has a private memory for storing the original image I of the current frame and the high-resolution reference image R' in a range required for refinement, and carries out the matching process using the same memory. The matching circuit 906 further reads the newly required coordinate information (coordinate information for the grid points 704, 706, 711 for the example of FIG. 9, because the coordinate information for the grid points 707, 708 and 710 are used in the previous process) for grid points in the reference image R from the coordinate point coordinate memory 904, thereby performing the refinement of the "hexagonal matching". In accordance with the result of this process, the refined coordinate of a grid point on the reference image R (the coordinate of the grid point 703 in the example of FIG. 9) is written in the grid point coordinate memory 904. This particular process completes the refinement of the grid point 703, and the refinement process section 905 proceeds to the refinement of the grid point 704. Upon completion of the entire refinement process, the information stored in the grid point coordinate memory 904 is converted into a motion vector for each grid point at a vector computation circuit 908 and output as motion information 415.

Figure 11:
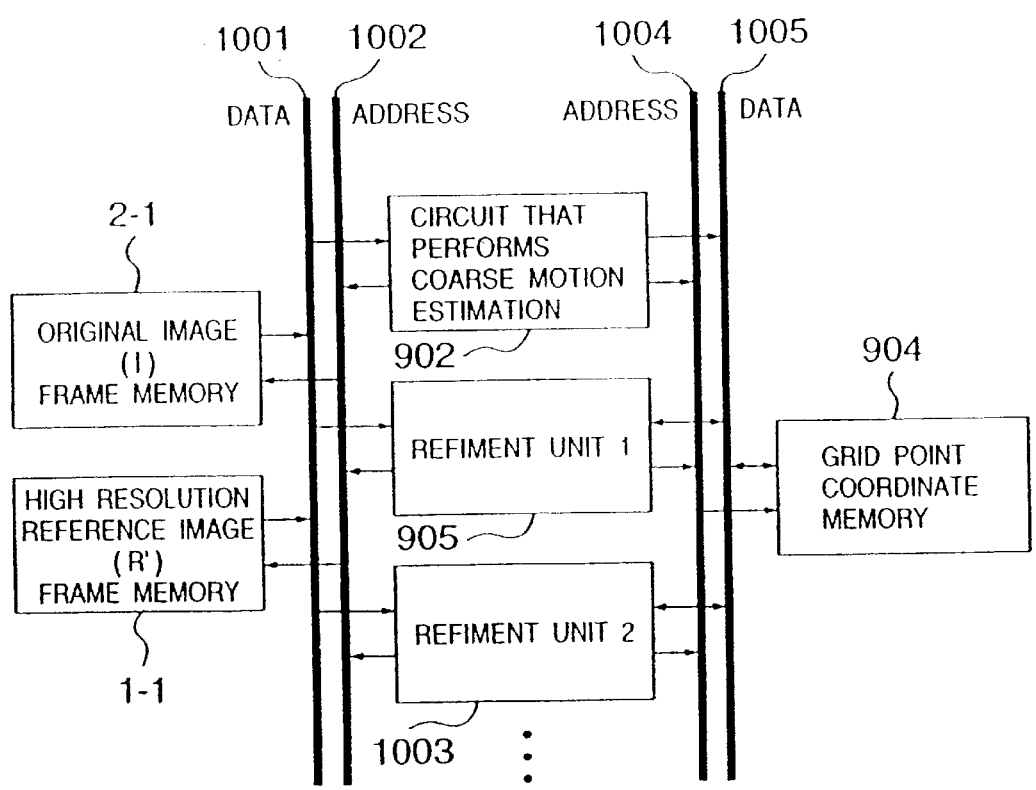
FIG. 11 is a diagram showing the case in which parallel processing is introduced to a scheme used for performing motion estimation while fetching the required portion of the original image of the current frame and a reference image little by little.

FIG. 11 shows an example of introducing the parallel operation to the process at the motion estimation section 909 of the video decoder 1 shown in FIG. 10. The reference numerals in FIG. 11 identical to those in FIG. 10 designate the same component parts respectively as in FIG. 10. In this example, there are a plurality of refinement process sections for refining the "hexagonal matching", and each section shares the processing operation. A common data bus 1001 and an address bus 1002 are used for reading the luminance value information from the frame memory 2-1 and the frame memory 1—1 which store the original image I of the current frame and the reference image R. On the other hand, a common data bus 1005 and an address bus 1004 are used for reading information from or writing information into the grid point coordinate memory 904 which stores the coordinates of the grid points on the reference image. Through these buses, information is transferred by a circuit 902 for performing coarse motion estimation of grid points and circuits 905 and 1003 for performing the refinement operation for the "hexagonal matching". The refinement process sections 905 and 1003 have the same configuration. The refinement operation can be carried out at higher speed by adding a refinement process section of a similar configuration. The refinement process sections can operate substantially independently of each other except for the processes of reading the luminance value information and reading/writing the grid point coordinate information. Therefore, a parallel process is secured while avoiding conflicts in memory access.

In the embodiments shown in FIGS. 9, 10 and 11, the refinement process requires the interpolation computations in the number of about (2+2Ns/Ng)×(m×m−1) for each pixel on the reference image R. This number is approximately (2+2Ns/Ng) times greater than the number of interpolation computations required for the first embodiment shown in FIG. 5. Since there is no need of a memory for storing the whole of the high-resolution reference image F', however, the total memory capacity requirement can be reduced.

Taking into consideration the facility of multiply and divide operations in a circuit, m1 and m2 are preferably a power of 2. With the reduction in the magnitude of m1 and m2, the circuit scale can be reduced. On the other hand, the approximation accuracy of the coordinate (motion vector) for motion estimation is adversely affected, and the prediction error is likely to be inverted in magnitude in the computation of Equation 1. The result of motion estimation thus is distorted, thereby deteriorating the performance of prediction. With the increase of m1 and m2, by contrast, the inverse phenomenon results. Taking the circuit scale into consideration, the m1 or m2 value of 4 or less is desirable. When the performance of prediction is taken into account, however, 2 or more is a desirable value of m1 and m2. Balancing between these two extremes, the appropriate value of m1 and m2 is 2 and 4 respectively.

When motion estimation is carried out using a high-resolution reference image R' with an image density of m times larger in horizontal and vertical directions, the value of the transformation functions fi(x,y) and gi(x,y) in Equations 5 to 7 is limited to an integer multiple of 1/m. In other words, this indicates that the minimum unit of the transformation function becomes 1/m of the interval between adjacent pixels. This restriction, however, is applied only to the motion estimation, and need not be observed in synthesizing the predicted image P. In the motion compensation based on spatial transformation, on the other hand, in order to prevent a mismatch of predicted images P in the video coder 1 at the sending end and in the video decoder 2 at the receiving end, some standard is required to be established with respect to the computation accuracy of the transformation function for synthesizing the predicted image P. One method of establishing such a standard is by setting a minimum unit of the transformation function for synthesizing the predicted image P as in motion estimation.

In this method, the horizontal and vertical components of the motion vector of each pixel used in synthesizing the predicted image P at the synthesis circuit 4-1 of the video coder 1 and the synthesis circuit 4-2 of the video decoder 2 are specified to assume only a value equal to an integer multiple of 1/d1 and 1/d2 (d1 and d2 are positive integers) respectively of the distance between adjacent pixels. In other words, the synthesis circuits 4-1 and 4-2 are constructed to include means for rounding the computation result of the transformation functions fi(x,y) and gi(x,y) into a value equal to an integer multiple of 1/d1 and a value equal to an integer multiple of 1/d2, respectively.

With reference to the case using the affine transformation (Equation 5) as a transformation function, explanation will be made below about an embodiment of a method in which the computation result of the transformation function is rounded into a value equal to an integer multiple of 1/d1 and 1/d2. For simplicity's sake, it is assumed that d1=d2=d (d: positive integer) It is also assumed that the patch is triangular in shape and that the motion vectors of three vertices of the patch are transmitted as motion information.

Figure 12:
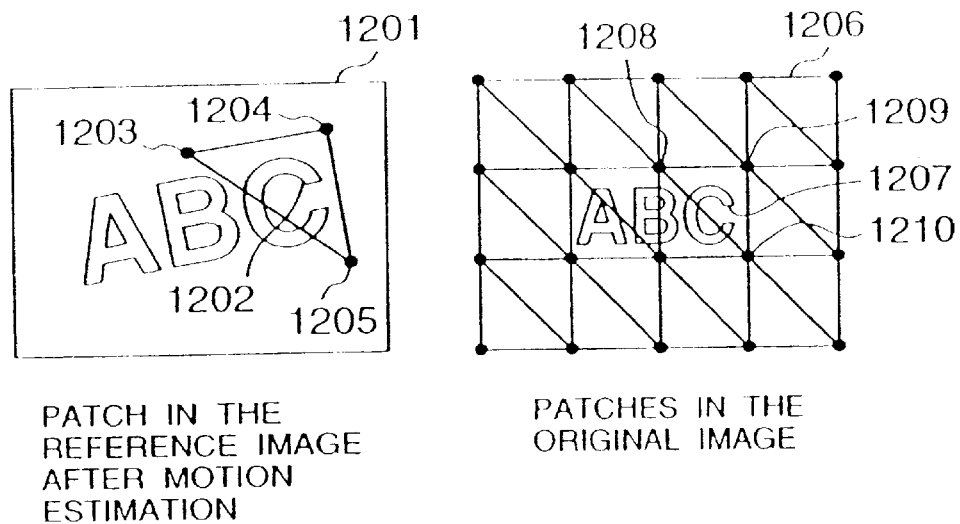
FIG. 12 is a diagram showing an example translation and deformation of a patch in the motion compensation based on spatial transformation.

The following description deals with the example shown in FIG. 12. A patch 1202 in the reference image R1201 is estimated to have been translated and deformed to a patch 1207 of a current frame 1206. Grid points 1203, 1204, 1205 correspond to grid points 1208, 1209, 1210, respectively. In the process, it is assumed that the coordinates of the vertices 1203, 1204, 1205 of the patch 1202 are (x1', y1'), (x2', y2'), (x3', y3') respectively, and the coordinates of the vertices 1208, 1209, 1210 of the patch 1207 are (x1, y1), (x2, y2), (x3, y3), respectively. All the coordinate values are assumed to be an integral value not negative. The motion parameter aij of Equation 5 for this patch can be expressed as $$\begin{pmatrix} ai1 & ai4 \\ ai2 & ai5 \\ ai3 & ai6 \end{pmatrix} = \frac{1}{Di} \begin{pmatrix} y2-y3 & y3-y1 & y1-y2 \\ x3-x2 & x1-x3 & x2-x1 \\ x2y2-x3y2 & x3y1-x1y3 & x1y2-x2y1 \end{pmatrix} \begin{pmatrix} x1' & y1' \\ x2' & y2' \\ x3' & y3' \end{pmatrix} \quad (9)$$

$$Di = x1(y2-y3) - y1(x2-x3) + (x2y3-x3y2)$$

In this equation, any dividing operation is not performed and aij (j: 1 to 6) is retained in the form of aij=aji'/Di where both the numerator and denominator are an integer. Then, the computation result of Equation 5 can always be given in the form of a fraction having a numerator and a denominator of an integral number such as fi(x,y)=fi'(x,y)/Di and gi(x,y)=gi'(x,y)/Di. Defining the symbol "//" as representing a dividing operation between integral values (a dividing operation in which the decimal component of the computation result is discarded), it is assumed that $$Fi(x, y) = \frac{1}{d}\{(dfi'(x, y) + ki) // Di\} \quad (10)$$

$$Gi(x, y) = \frac{1}{d}\{(dgi'(x, y) + ki) // Di\}$$

where ki=Di//2. Fi(x,y) and Gi(x,y) are the functions for rounding fi(x,y) and gi(x,y) respectively into a value equal to the nearest integer multiple of 1/d.

In the synthesis circuit 4-1 of the video coder 1 and the synthesis circuit 4-2 of the video decoder 2, if Fi(x,y) and Gi(x,y) of Equation 7 are used in place of fi(x,y) and gi(x,y) of Equation 4, the horizontal and vertical components of the motion vector of each pixel can be restricted to assume only a value equal to an integer multiple of 1/d of the distance between adjacent pixels. Also, by using Fi(x,y) and Gi(x,y) for both the sending and the receiving ends, a mismatch of the predicted image P attributable to the error of the transformation function can be prevented in a computation comparatively low in accuracy.

Figure 13:
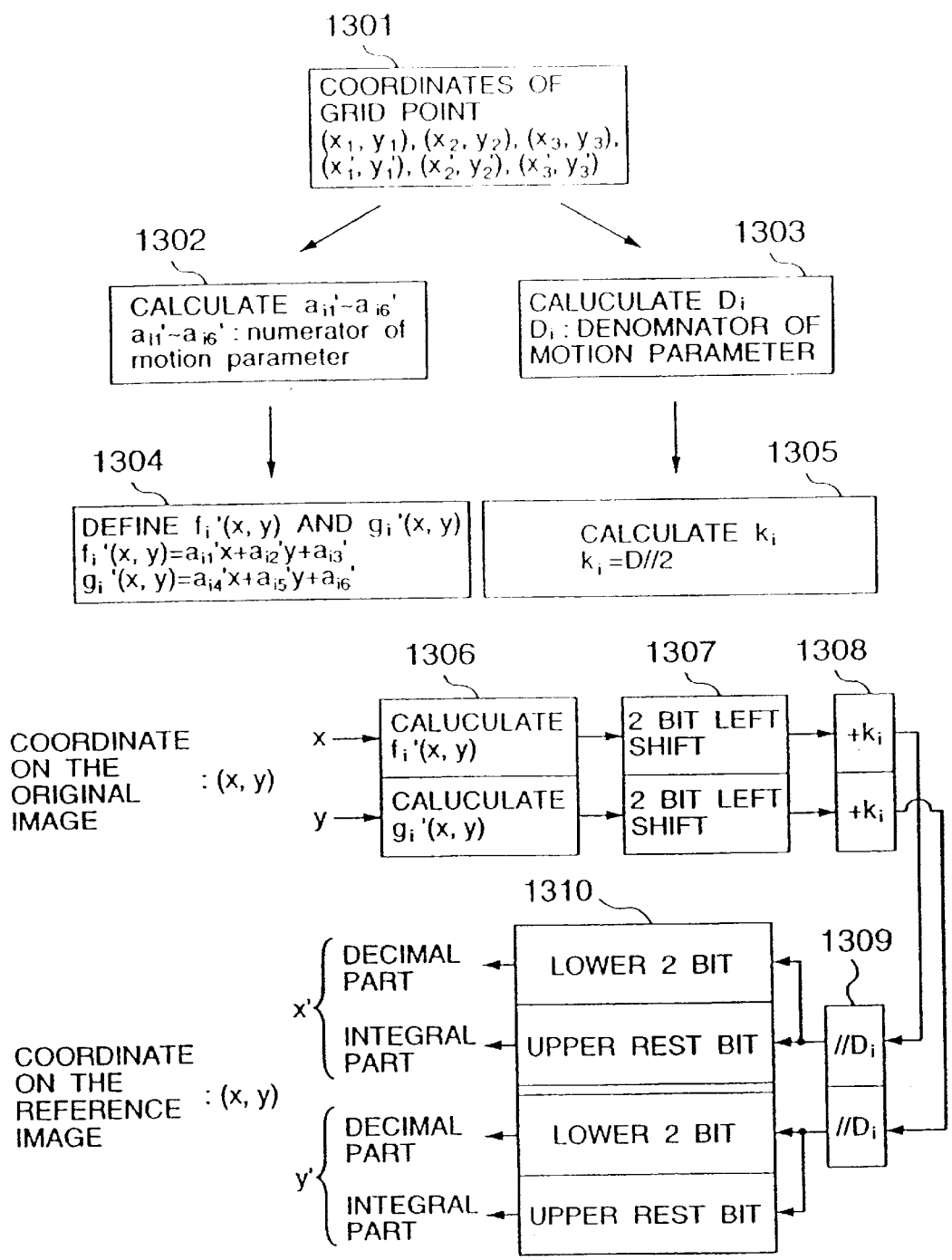
FIG. 13 is a diagram showing an example method of computing the transformation function when the horizontal and vertical components of a motion vector are restricted to an integer multiple of ¼ (d=4).

FIG. 13 shows the flow of operation for computing Fi(x,y) and Gi(x,y) when d=4 at the synthesis circuits 4-1, 4-2. First, when the coordinate of vertices of a patch before and after deformation are given at step 1301, functions fi'(x,y) and gi'(x,y) are defined at steps 1302 and 1304, a constant Di is determined at step 1303, and a constant ki determined at step 1305. Using these functions and constants, the values of Fi(x,y) and Gi(x,y) are calculated from the coordinate (x,y) for each pixel in the patch. When (x,y) is given in a binary integral notation, first, step 1306 computes the sum of products to determine the value of fi'(x,y) and gi'(x,y), the result of which is shifted to the left by two bits at step 1307 into a value four (=d) times as large. This result is added to ki at step 1308, and further is divided by Di at step 1309 (the figures of the computation result below the decimal point are discarded), thereby determining the values of 4Fi(x,y) and 4Gi(x,y). With these integral numbers of 4Fi(x,y) and 4Gi(x,y), step 1310 sets the decimal point between the second and third digits from the low-order place. The values of Fi(x,y) and Gi(x,y) can thus be obtained. This has the same meaning as having carried out the operation of dividing by 4.

Figure 14:
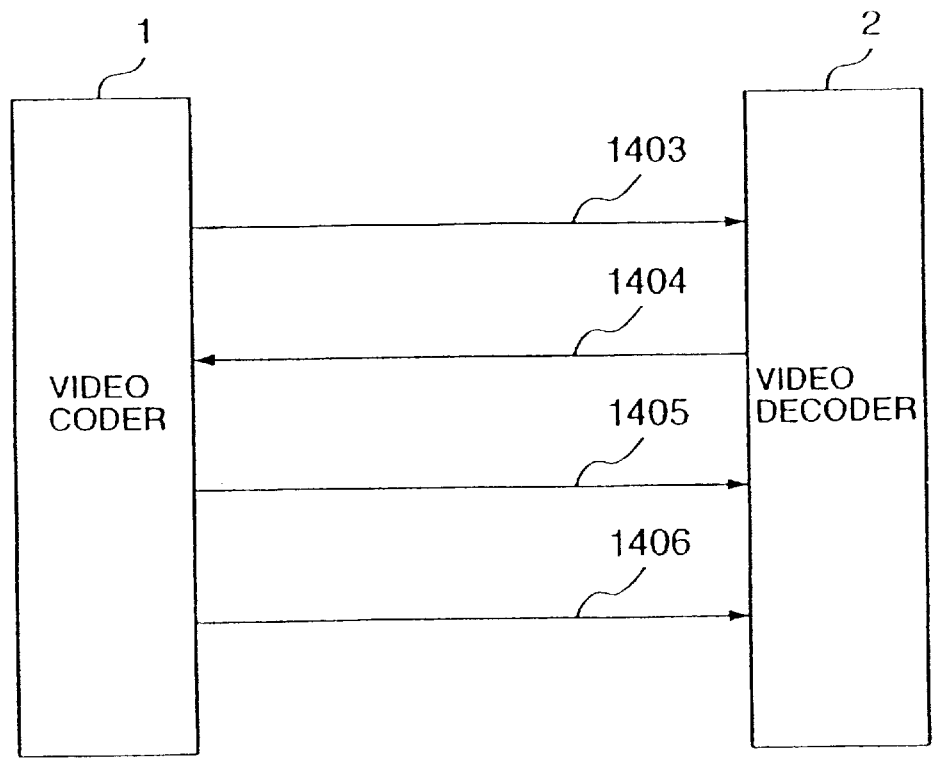
FIG. 14 is a diagram showing an example scheme for determining the value of 1/d providing a minimum unit of the pixel motion vector by communication between the sending and receiving ends before transmission of video data.

The value d can be either defined as a fixed parameter for the coding/decoding system, or can be determined as a variable by arrangement between the sending and the receiving ends before transmitting the video data. An example procedure for determining the value d by communication between the video coder 1 at the sending end and the video decoder 2 at the receiving end is shown in FIG. 14. First, step 1403 causes the sending end to notify the receiving end by communication that the allowable upper limit of d is 4 due to the hardware restriction of the video coder 1. Then, the receiving end at step 1404 notifies the sending end by communication that the upper limit of d is 2 due to the restriction of the video coder 2. As a result, the sending end decides that the optimum value of d is 2 and gives advice at step 1405 that the video data subsequently transmitted is coded with d as 2. Immediately after this advice, the sending end transmits video data at step 1406. Generally, the larger the value d, the more complicated the system hardware. Consequently, it is considered appropriate that the sending end employs the upper limit value for the sending or receiving end, whichever is lower. For this method to be realized, the video coder 1 and the video decoder 2 are required to have a function capable of accommodating the value of d equal to or lower than their own upper limit respectively.

Considering the facility of multiply and divide operation, a power of 2 is recommendable as the value of d. The larger the value of d, the smaller the prediction error. In spite of this, the synthesizing process for the predicted image P becomes more complicated. Taking the performance of prediction into consideration, the desirable value of d is 2 or more. As a trade-off between the performance of prediction and the complication of the process, an appropriate value of d is specifically 2, 4, 8.

The following-described modifications also obviously are included in the present invention.

(1) Instead of the bilinear interpolation (Equation 2) employed in the present specification as a function for interpolation of the luminance value, other functions may be used with equal effect. With the increase in the complexity of a function, the advantage is enhanced for reducing the required number of interpolations (2) Also, instead of the affine transformation (Equation 5) which was emphasized in the present specification as a type of transformation function, other transformation functions (Equation 6 or 7) may be used with equal effect. The present invention remains effective as far as the pixels in the same patch need not follow a common motion vector and the vertical and horizontal components of the motion vector of a pixel can assume a value other than an integer multiple of the distance between adjacent pixels. Also, the invention is effective as far as the computation result of a transformation function can change according to the computation accuracy thereof.

(3) The patch can be of any shape that defines a set of pixels and is not necessarily a triangle as described in the present specification.

(4) With regard to the motion compensation based on spatial transformation, a method is taken up in the present specification in which the motion vector changes continuously at the boundary of a patch. In spite of this, an alternative method may be employed in which the motion parameter is transmitted directly for each patch or the discontinuity of the motion vector at the patch boundary is otherwise allowed.

(5) Although the present specification employs the block matching and the hexagonal matching as a motion estimation algorithm, a method based on other matching schemes may be used with equal effect. The present invention is effective in any method in which the prediction error is evaluated a multiplicity of times.

(6) In the motion compensation based on spatial transformation, the motion information transmitted may be other than motion vectors of patch vertices (grid points) as in the case of the present specification. Any motion information may be used which specifies the transformation function for each patch. The motion parameter aij of Equation 5, for example, may be transmitted directly. In the case where a motion parameter is transmitted directly in this way, the application of this invention makes it possible to reduce the accuracy of the motion parameter (to reduce the number of digits) transmitted while preventing a mismatch of the predicted image attributable to the computation accuracy of a transformation function. The smaller the value of d, the less the number of digits required of the motion parameter, with the result that the amount of transmitted information can be reduced.

(7) The values of m1 and m2, which are equal to each other in the embodiment described above, may alternatively be not equal to each other.

(8) Unlike in this embodiment representing a case where the values of d1 and d2 are equal to each other, they may be different from each other.

(9) The present specification deals with a method in which the patch structure of the current frame is fixed and the patch of a reference image is deformed. Nevertheless, a method may alternatively be used in which the patch structure of a reference image is fixed while the patch of the current frame is deformed.

(10) Unlike in the present specification employing a single reference image for synthesizing a single predicted image, a plurality of reference images may be used with equal effect.

According to the present invention, it is possible to reduce the number of computations for interpolation of luminance values in the motion estimation process for a motion compensation scheme in which all the pixels associated with the same patch are not restricted to have a common motion vector but the horizontal and vertical components of the motion vector of pixels can assume an arbitrary value other than an integer multiple of the distance between adjacent pixels.

Further, according to the present invention, the computation accuracy of the transformation function can be reduced while preventing a mismatch of the predicted image in synthesizing a predicted image by a motion compensation scheme in which all the pixels associated with the same patch are not restricted to have a common motion vector and the horizontal and vertical components of the motion vector of pixels can assume an arbitrary value other than an integer multiple of the distance between adjacent pixels. Furthermore, in a method of determining the values of d1 and d2 by arrangement between the sending and receiving ends before transmission of video data, an optimum image quality of a decoded image can be determined in accordance with the performance of the systems at the sending end and the receiving end.

What is claimed is:

1. A method for coding an image comprising the steps of:

calculating motion vectors of vertices of a patch in an image being encoded; and outputting horizontal and vertical components of said motion vectors of said vertices and information specifying that values of the horizontal and vertical components of a motion vector for each pixel in said patch are integral multiples of 1/d of a distance between adjacents pixels, where d is an integer not less than 2, wherein information specifying the value of d is output as said information specifying that the values of the horizontal and vertical components of a motion vector for each pixel in said patch are integral multiples of 1/d of a distance between adjacent pixels.

2. A method for coding an image according to claim 1, wherein the value of said d is $2^w$, w being a positive integer.

3. A method for coding an image according to claim 1, further comprising the step of:

storing a reference image;

wherein said motion vectors of vertices of a patch in an input image is calculated by carrying out motion compensation between said input image and said reference image.

4. A method for coding an image according to claim 3, wherein the value of said d is $2^w$, w being a positive integer.

5. A video coder for coding an image comprising:

means for calculating motion vectors of vertices of a patch in an image being encoded; and means for outputting horizontal and vertical components of said motion vectors of said vertices and information specifying values of the horizontal and vertical components of a motion vector for each pixel in said patch are integral multiples of 1/d of a distance between adjacent pixels, where d is an integer of not less than 2, wherein information specifying the value of d is output as said information specifying that the values of the horizontal and vertical components of a motion vector for each pixel in said patch are integral multiples of 1/d of a distance between adjacent pixels.

6. A video coder according to claim 5, wherein the value of said d is $2^w$, w being a positive integer.

7. A video coder according to claim 5, further comprising:

a memory which stores a reference image;

wherein said means for calculating motion vectors is connected to said memory and reads out the reference image from said memory, and calculates said motion vectors of vertices of a patch in an input image by carrying out motion compensation between said input image and said reference image.

8. A video coder according to claim 7, wherein the value of said d is $2^w$, w being a positive integer.

* * * * *